(12) United States Patent
Luo et al.

(10) Patent No.: US 10,279,433 B2
(45) Date of Patent: May 7, 2019

(54) DEVICE AND METHOD FOR DEGATING OF ALUMINUM WHEEL BLANK BY LASER CUTTING

(71) Applicant: CITIC Dicastal CO., LTD, Qinhuangdao (CN)

(72) Inventors: Fengbao Luo, Qinhuangdao (CN); Ruixiao Zhou, Qinhuangdao (CN); Chuan Dai, Qinhuangdao (CN); Dengyao Li, Qinhuangdao (CN); Xiao Liu, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 218 days.

(21) Appl. No.: 15/337,663

(22) Filed: Oct. 28, 2016

(65) Prior Publication Data

US 2017/0189998 A1 Jul. 6, 2017

(30) Foreign Application Priority Data

Oct. 30, 2015 (CN) .......................... 2015 1 0732164

(51) Int. Cl.
*B23K 26/361* (2014.01)
*B23K 26/40* (2014.01)
(Continued)

(52) U.S. Cl.
CPC ............ *B23K 26/361* (2015.10); *B23K 26/40* (2013.01); *B23K 37/0426* (2013.01);
(Continued)

(58) Field of Classification Search
CPC ...... B23K 26/361; B23K 26/02; B23K 26/03; B23K 26/0604; B23K 26/0823;
(Continued)

(56) References Cited

U.S. PATENT DOCUMENTS

4,623,229 A * 11/1986 Galan .................... B23K 26/02
219/121.63
4,760,583 A * 7/1988 Sasnett .................. B23K 26/02
372/107
(Continued)

*Primary Examiner* — Jimmy Chou
(74) *Attorney, Agent, or Firm* — Howard IP Law, PLLC; Jeremy Howard (57) ABSTRACT

The present invention provides a device and method for degating of an aluminum wheel blank by laser cutting, and the device comprises members including a lower lifting frame movable long beam, a middle lifting frame inner side oblique beam, a middle lifting frame pin shaft, a rubber supporting cushion, an upper lifting frame long fixed beam, a middle lifting frame outer side oblique beam, a first stroke limiting frame, a first stroke limiting wheel, a second stroke limiting frame, a second stroke limiting wheel, piston firm retaining rings, frame-shaped guide plates, directional sliding blocks, grating positioning devices, a wheel blank member, a roller way, a lower rack fixed frame, a lower gate taking device fixed frame, a laser cutting head, an eccentric turning wheel, high-temperature-resistant resin clamping gaskets, clamping blocks, rack vertical corner frames, clamping hydraulic cylinder pistons, horizontal clamping hydraulic cylinders, a movable plate and the like. When in use, the device of the present invention can realize the function of online removal of a wheel gate, can improve work efficiency, can also reduce labor force, and has the characteristics of high cutting precision, round and burr-free cutting position, stable performance, high degree of automation and the like.

1 Claim, 6 Drawing Sheets

(51) Int. Cl.
  *B23K 37/053* (2006.01)
  *B23K 37/04* (2006.01)
  *B23K 103/10* (2006.01)
  *B23K 101/00* (2006.01)

(52) U.S. Cl.
  CPC ...... *B23K 37/053* (2013.01); *B23K 2101/006* (2018.08); *B23K 2103/10* (2018.08)

(58) Field of Classification Search
  CPC ............ B23K 26/0838; B23K 26/0869; B23K 26/40; B23K 2103/10; B23K 2101/06; B23K 2101/006; B21D 53/264
  USPC ............ 219/121.67, 121.72, 121.76, 121.78, 219/121.82
  See application file for complete search history.

(56) References Cited

U.S. PATENT DOCUMENTS

| | | | | |
|---|---|---|---|---|
| 5,225,650 A | * | 7/1993 | Babel | B23K 26/0823 219/121.69 |
| 5,314,288 A | * | 5/1994 | Schmidt | B62D 43/045 254/323 |
| 6,539,830 B1 | * | 4/2003 | Koskovich | B23D 59/001 144/245.2 |
| 6,706,999 B1 | * | 3/2004 | Barrett | B23K 26/02 219/121.74 |
| 9,000,321 B2 | * | 4/2015 | Yamaguchi | B23K 7/002 219/121.58 |
| 2002/0144987 A1 | * | 10/2002 | Tomlinson | B23K 26/02 219/121.74 |
| 2003/0080096 A1 | * | 5/2003 | Yamaguchi | B23K 37/0461 219/121.39 |
| 2003/0102293 A1 | * | 6/2003 | Therond | B23K 26/0643 219/121.78 |
| 2004/0104203 A1 | * | 6/2004 | Yamaguchi | B23K 5/22 219/121.36 |
| 2009/0245945 A1 | * | 10/2009 | Ostendarp | B23K 26/0823 407/30 |
| 2011/0062127 A1 | * | 3/2011 | Gu | B23K 26/04 219/121.69 |
| 2011/0089148 A1 | * | 4/2011 | Mootz | B23K 26/0838 219/121.63 |
| 2013/0193122 A1 | * | 8/2013 | Nomaru | H01L 21/76898 219/121.62 |
| 2013/0193125 A1 | * | 8/2013 | Nishiyama | B23K 26/0823 219/121.85 |
| 2015/0001195 A1 | * | 1/2015 | Okada | B23K 26/08 219/121.67 |
| 2015/0158124 A1 | * | 6/2015 | Kino | G02B 6/44 219/121.78 |
| 2017/0189998 A1 | * | 7/2017 | Luo | B23K 37/0426 |

* cited by examiner

DEVICE AND METHOD FOR DEGATING OF ALUMINUM WHEEL BLANK BY LASER CUTTING

This application claims priority from CN 201510732164.8, filed on Oct. 30, 2015, the entire content of which is incorporated herein by reference.

TECHNICAL FIELD

The present invention relates to the field of mechanical processing of hubs, and in particular to a device and method for degating of an aluminum wheel blank by laser cutting.

BACKGROUND ART

At present, in a process of casting and machining of a low-pressure aluminum alloy wheel, a gate on a casting blank must be removed before machining due to a casting filling process; otherwise, subsequent machining operation will be affected. According to a traditional degating practice, the gate is cut by a specific drilling machine after the following operation: a blank is cast and quenched, X-ray flaw detection is performed on the wheel to confirm that no defect exists and the wheel blank is placed on a degating drilling machine and positioned by an operator. This method increases labor intensity for the operator as the operator needs to place wheels continuously and remove the wheels after processing, is not conducive to mechanical automation production, and greatly reduces machining production efficiency. In the meantime, during cutting, since positioning is carried out at the lower end of a rim of a hub and a cutting position is at a flange in the center of the upper end, it is liable to cause deformation of a spoke and difficulty in subsequent machining as well as scrap of castings of the wheels.

SUMMARY OF THE INVENTION

In order to overcome the shortcomings of the prior art, an object of the present invention is to provide a laser edge cutting device for cutting a gate of a casting online. Since laser cutting is non-contact cutting, the deformation of a spoke can be effectively prevented, processing precision is high, the machining quality of a hub is effectively guaranteed, online continuous work can be realized, meanwhile, manpower and material resources are saved, the production efficiency is greatly improved, the device is suitable for wheel types with different specifications, has strong universality, generates no aluminum skimming during cutting, and has low noise and high energy saving property.

In one aspect of the present invention, a device for degating of an aluminum wheel blank by laser cutting is provided, which comprises the following members: a lower lifting frame movable long beam (1), a middle lifting frame inner side oblique beam (2), a middle lifting frame pin shaft (3), a rubber supporting cushion (4), an upper lifting frame long fixed beam (5), a middle lifting frame outer side oblique beam (6), a first stroke limiting frame (7), a first stroke limiting wheel (8), a second stroke limiting frame (7'), a second stroke limiting wheel (8'), piston firm retaining rings (9), frame-shaped guide plates (10), directional sliding blocks (11), grating positioning devices (12), a wheel blank member (13), a roller way (14), a lower rack fixed frame (15), a lower gate taking device fixed frame (16), a laser cutting head (17), an eccentric turning wheel (18), high-temperature-resistant resin clamping gaskets (19), clamping blocks (20), rack vertical corner frames (21), clamping hydraulic cylinder pistons (22), horizontal clamping hydraulic cylinders (23), a movable plate (24), a triangular connecting plate (25), clamping connecting rods (26), a hydraulic cylinder fixing frame (27), a rubber cushion fixing corner bracket (28), a lifting hydraulic cylinder (29), a lifting hydraulic cylinder piston (30), a connecting pin (31), a lifting hydraulic cylinder piston connecting pin shaft (32), a lifting connecting frame (33), an upper lifting frame short fixed frame (34), a positioning pin (35) for middle lifting frame inner side oblique beam, a middle connecting beam (36) of inner beam, middle outer cushions (37) of inner beam, triangular reinforced plates (38), a lower lifting frame movable short beam (39), a pneumatic jaw (40), a jaw connecting rod (41), a rotary motor fixed plate (42), jaw lifting pistons (43), a jaw rotary motor (44), jaw hydraulic cylinders (45), a laser head rotary motor fixed cover (46) and a laser head rotary motor (47); the rack vertical corner frames (21) are mounted on the lower rack fixed frame (15), and the upper lifting frame long fixed beam (5) is mounted at top ends of the rack vertical corner frames (21) to form a rack; a first end of the middle lifting frame inner side oblique beam (2) is hinged to the upper lifting frame long fixed beam (5), the first stroke limiting wheel (8) is mounted on the other end of the middle lifting frame inner side oblique beam (2), the first stroke limiting wheel (8) is mounted to and rolls in the first stroke limiting frame (7), and the first stroke limiting frame (7) is fixed on the lower lifting frame movable long beam (1); a first end of the middle lifting frame outer side oblique beam (6) is hinged to the lower lifting frame movable long beam (1), the second stroke limiting wheel (8') is mounted on the other end of the middle lifting frame outer side oblique beam (6), the second stroke limiting wheel (8') is mounted to and rolls in the second stroke limiting frame (7'), and the second stroke limiting frame (7') is fixed under the upper lifting frame long fixed beam (5); the middle lifting frame inner side oblique beam (2) is hinged to the middle lifting frame outer side oblique beam (6) through the middle lifting frame pin shaft (3), so that the middle lifting frame outer side oblique beam (6) is located on the outside of the middle lifting frame inner side oblique beam (2); the rubber supporting cushion (4) is mounted under the upper lifting frame long fixed beam (5) through the rubber cushion fixing corner bracket (28) and is supported between the upper lifting frame long fixed beam (5) and the middle lifting frame inner side oblique beam (2) or the middle lifting frame outer side oblique beam (6) when the lower lifting frame movable long beam (1) rises; the lifting hydraulic cylinder piston (30) of the lifting hydraulic cylinder (29) is fixed to the lower lifting frame movable long beam (1) through the connecting pin (31) and the lifting connecting frame (33), and the other end of the lifting hydraulic cylinder (29) is fixed to the upper lifting frame long fixed beam (5) through the hydraulic cylinder fixing frame (27); the movable plate (24) is fixed under the lower lifting frame movable long beam (1), the horizontal clamping hydraulic cylinders (23) are mounted at middle positions on both sides below the movable plate (24), the clamping hydraulic cylinder pistons (22) on left and right sides are locked and connected to corresponding sides of the frame-shaped guide plates (10) through the piston firm retaining rings (9), and one directional sliding block (11) is placed on an inner side of the corresponding frame-shaped guide plate (10) and is locked with one side of the corresponding clamping hydraulic cylinder piston (22) through the corresponding piston firm retaining ring (9), so that the frame-shaped guide plate (10) and the directional sliding block (11)

are driven to move together when the clamping hydraulic cylinder pistons (23) are set in a current movement; a hole is formed in the lower end of each directional sliding block (11), and the lower end of each directional sliding block (11) is connected to one clamping connecting rod (26) through a pin, and three clamping connecting rods (26) are mounted to circular heads of three corners of the triangular connecting plate (25) by studs; the clamping blocks (20) are mounted on top ends of the directional sliding blocks (11), the high-temperature-resistant resin clamping gaskets (19) are mounted on inner sides of the clamping blocks (20), the laser head rotary motor (47) is mounted within the laser head rotary motor fixed cover (46), the laser head rotary motor fixed cover (46) is mounted on the movable plate through screws, the eccentric turning wheel (18) is mounted under the laser head rotary motor (47), and a hole is formed in the eccentric turning wheel (18) to mount the laser cutting head (17); the lower gate taking device fixed frame (16) is mounted on a left side of the rack, the jaw hydraulic cylinders (45) are mounted above the lower gate taking device fixed frame (16), and the jaw lifting pistons (43) of the jaw hydraulic cylinders (45) are mounted on the rotary motor fixing plate (42), a circular hole is formed in the middle of the rotary motor fixing plate (42) for fixing the jaw rotary motor (44), and the jaw rotary motor (44) is fixed and connected to the jaw connecting rod (41), and the pneumatic jaw (40) is mounted at an end of the jaw connecting rod (41).

In other aspects of the present invention, a method for degating of an aluminum wheel blank by laser cutting by using the abovementioned device is further provided and is characterized in that the method comprises steps: locating, by the grating positioning devices (12), a wheel casting, and stopping the running of the roller way; performing ejection movement by the upper lifting hydraulic cylinder piston (30), wherein the lifting hydraulic cylinder piston (30) and the connecting pin (31) drive the lifting connecting frame (33) to make the lower lifting frame movable long beam (1) move downward along with parts under the movable plate (24); stopping the movement of the lifting hydraulic cylinder piston (30) after the laser cutting head (17) reaches a predetermined position, and keeping self-locking at this position; then starting horizontal movements in the same direction of the horizontal clamping hydraulic cylinder pistons (22) on left and right sides, wherein the middle frame-shaped guide plate (10) and the directional sliding block (11) embedded in the frame-shaped guide plate (10) are driven to move in the same direction by the corresponding clamping hydraulic cylinder piston (22); driving the triangular connecting plate (25) to rotate around the laser head rotary motor fixed cover (46) as a circular axis through the clamping connecting rod (26), wherein the clamping connecting rods (26) are connected to the directional sliding blocks (11) through the lifting hydraulic cylinder piston pin shafts (32), and the other ends of the clamping connecting rods (26) are mounted on circular heads of the triangular connecting plate (25); in the meanwhile, moving the directional sliding blocks (11) on both sides inward to make the three clamping blocks (20) mounted under the directional sliding blocks (11) move inward, wherein pistons of the horizontal clamping hydraulic cylinders (23) stop moving and are in self-locking positions when the high-temperature-resistant resin clamping gaskets (19) on the clamping blocks (20) come into contact with the aluminum wheel blank member and clamp the blank member to be motionless; then starting rotating the laser head rotary motor (47), wherein since the laser cutting head is mounted on the eccentric turning wheel (18) under the laser head rotary motor (47), the rotation of the eccentric turning wheel (18) drives the laser cutting head to rotate, so as to achieve the purpose of cutting a gate; stopping the rotation of the middle laser head rotary motor (47) after cutting, wherein the horizontal clamping hydraulic cylinders on left and right sides of the movable plate (24) start moving in opposite directions to loosen the aluminum wheel blank member and stop when the clamping hydraulic cylinder pistons (22) reach original positions, the lifting hydraulic cylinder piston (30) begins to move in an opposite direction to drive the movable plate (24) and parts under the movable plate (24) to move upward, so as to return to original positions.

The present invention further provides the following other technical solutions:

to achieve the object described above, a technical solution of the present invention is as follows: a device for online cutting a gate of an aluminum wheel by laser, which is mainly composed of the following members: a lower lifting frame movable long beam, a middle lifting frame inner side oblique beam, a middle lifting frame pin shaft, a rubber supporting cushion, an upper lifting frame long fixed beam, a middle lifting frame outer side oblique beam, stroke limiting frames, stroke limiting wheels, piston firm retaining rings, frame-shaped guide plates, directional sliding blocks, a grating positioning device, a wheel blank member, a roller way, a lower rack fixed frame, a lower gate taking device fixed frame, a laser cutting head, an eccentric turning wheel, high-temperature-resistant resin clamping gaskets, clamping blocks, rack vertical corner frames, a clamping hydraulic cylinder piston, horizontal clamping hydraulic cylinders, a movable plate, a triangular connecting plate, clamping connecting rods, a hydraulic cylinder fixing frame, a rubber cushion fixing corner bracket, a lifting hydraulic cylinder, a lifting hydraulic cylinder piston, a connecting pin, a lifting hydraulic cylinder piston connecting pin shaft, a lifting connecting frame, an upper lifting frame short fixed frame, a positioning pin for middle lifting frame inner side oblique beam, a middle connecting beam of inner beam, middle outer cushions of inner beam, a triangular reinforced plate, an lower lifting frame movable short beam, a pneumatic jaw, a jaw connecting rod, a rotary motor fixing plate, jaw lifting pistons, a jaw rotary motor, jaw hydraulic cylinders, a laser head rotary motor fixed cover, a laser head rotary motor and the like. The lifting frame long and short fixed beams are mounted and connected fixedly above the rack, and intermediate parts of upper ends of the middle lifting frame inner and outer side oblique beams are connected through the intermediate pin shaft and may rotate around the intermediate pin shaft; both ends of the inner and outer side oblique beams are also connected with the upper lifting frame fixed beam and the lower lifting frame movable beam by pin shafts, and right sides of the inner and outer side oblique beams are connected with the stroke limiting wheels which may roll within the stroke limiting frames. The lifting hydraulic cylinder fixing frame is fixedly connected to the lifting frame fixed beam, the lifting hydraulic cylinder piston is connected with the connecting pin which is fixed to the lifting connecting frame through screws, and the connecting frame is fixed to the lifting frame movable long beam. The movable plate is connected fixedly under the lifting frame movable long beam, one horizontal clamping hydraulic cylinder is mounted at a middle position on each side below the movable plate, the horizontal clamping hydraulic cylinder pistons on left and right sides are locked and connected to corresponding sides of the frame-shaped guide plates through the piston firm retaining rings, one directional sliding block is placed on an inner side of the corresponding frame-shaped guide plate to lock with one side of the corresponding clamping hydraulic cylinder piston through the corresponding piston firm retaining ring. Thus it can be ensured that the movement of the piston drives the frame-shaped guide plate and the directional sliding block to move. A hole is formed in the lower end of each directional sliding block, and the lower end of each directional sliding block is connected to the clamping connecting rod through a pin, and three clamping connecting rods are mounted to circular heads of three corners of the triangular connecting plate through studs respectively. The clamping blocks are mounted on top ends of the directional sliding blocks, and the high-temperature-resistant resin clamping gaskets are mounted on inner sides of the clamping blocks. The laser head rotary motor is mounted within the laser head rotary motor fixed cover, and the laser head rotary motor fixed cover is mounted on the movable plate through screws. The eccentric turning wheel is mounted under the laser head rotary motor, and a hole is formed in the eccentric turning wheel to mount the laser cutting head. The gate taking device fixed frame is mounted on a left side of the rack, the jaw lifting hydraulic cylinders are mounted thereon, the jaw lifting pistons are mounted on the rotary motor fixing plate, a circular hole is formed in the middle of the rotary motor fixing plate for fixing the jaw rotary motor, the jaw rotary motor is connected fixedly to the jaw connecting rod, and the pneumatic jaw is mounted at an end of the jaw connecting rod. The aluminum wheel blank member is placed on the roller way to move to a cutting position through the roller way. Switches of grating sensors are mounted on both sides of the roller way.

During actual operation, the grating sensors first locate a wheel casting to stop running of the roller way. The upper lifting hydraulic cylinder piston performs ejection movement, and the lifting hydraulic cylinder piston connecting pin shaft drives the lifting connecting frame to make the lower lifting frame movable long beam move downward along with parts under the movable plate. The lifting hydraulic cylinder piston stops the movement when the laser cutting head reaches a predetermined position and keeps self-locking at this position.

Then, the horizontal clamping hydraulic cylinder pistons on left and right sides start horizontal movements in the same direction, and the middle frame-shaped guide plate and the directional sliding block embedded in the frame-shaped guide plate are driven to move in the same direction by the corresponding clamping hydraulic cylinder piston. One clamping connecting rod is mounted on the directional sliding block through a pin shaft, and the other end of the clamping connecting rod is mounted on a circular head of the triangular connecting plate to drive the triangular connecting plate to rotate around the laser head rotary motor fixed cover as a circular axis. In the meantime, the directional sliding blocks on both sides move inward, so that the three clamping blocks mounted under the directional sliding blocks move inward, and the clamping hydraulic cylinder pistons stop the movement and are in self-locking positions when the high-temperature-resistant resin clamping gaskets on the clamping blocks come into contact with the aluminum wheel blank member and clamp it to make it motionless.

Then, the laser head rotary motor starts rotation; since the laser cutting head is mounted on the eccentric turning wheel under the laser head rotary motor, the rotation of the eccentric turning wheel drives the laser cutting head to rotate, so as to achieve the purpose of cutting a gate.

The laser head rotary motor stops the rotation after cutting, and the horizontal clamping hydraulic cylinders on both sides of the movable plate begin to move in opposite directions to loosen the aluminum wheel blank member and stop when the horizontal clamping hydraulic cylinder pistons reach original positions, and the lifting hydraulic cylinder piston begins to move in an opposite direction to drive the movable plate and the parts under the movable plate to move upward, so as to return to original positions.

In the meantime, the jaw lifting pistons on the left side of the rack move upward and stop until reaching a certain height, and the jaw rotary motor begins to rotate to drive the jaw connecting rod to rotate and stop at a position above the cut gate. The jaw lifting pistons move downward and stop until the pneumatic jaw at an end is in the middle position of the gate, and then the pneumatic jaw starts and clamps the cut gate. The jaw lifting hydraulic cylinder pistons begin to move upward and then stop, the jaw rotary motor rotates to drive the jaw connecting rod and the pneumatic jaw to return to original positions, and the jaw lifting hydraulic cylinder pistons move downward and stop until returning to original positions. Then the pneumatic jaw loosens the gate and the cut gate waste falls into a waste tank. The cut wheel falls on the roller way and the roller way starts running again, and the wheel leaves a cutting position and the cutting device waits for the next cutting cycle.

During use, the device of the present invention can realize the online removal of the wheel gate, can improve work efficiency, can also reduce labor force, and has the characteristics of high cutting precision, round and burr-free cut position, stable performance, high degree of automation and the like.

BRIEF DESCRIPTION OF DRAWINGS

In the following, embodiments of the present invention are described in detail in combination with figures, wherein.

Figure 1:
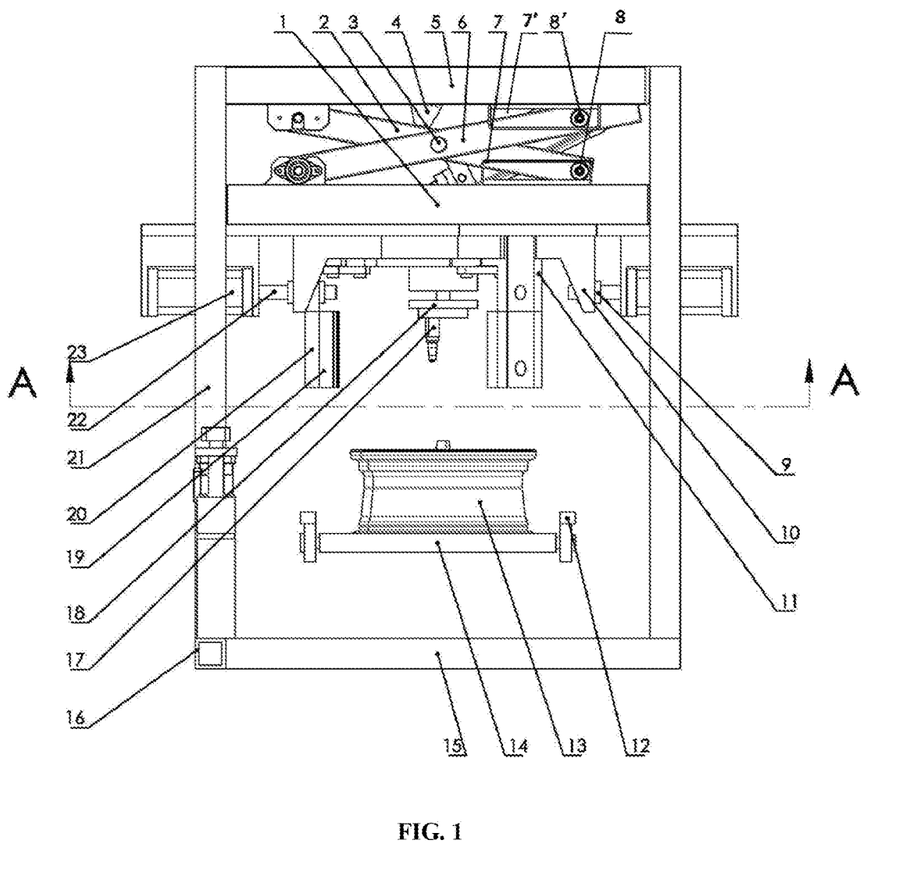
FIG. 1 is a front view of a device for degating of an aluminum wheel blank by laser cutting in an initial state of the present invention.
Figure 2:
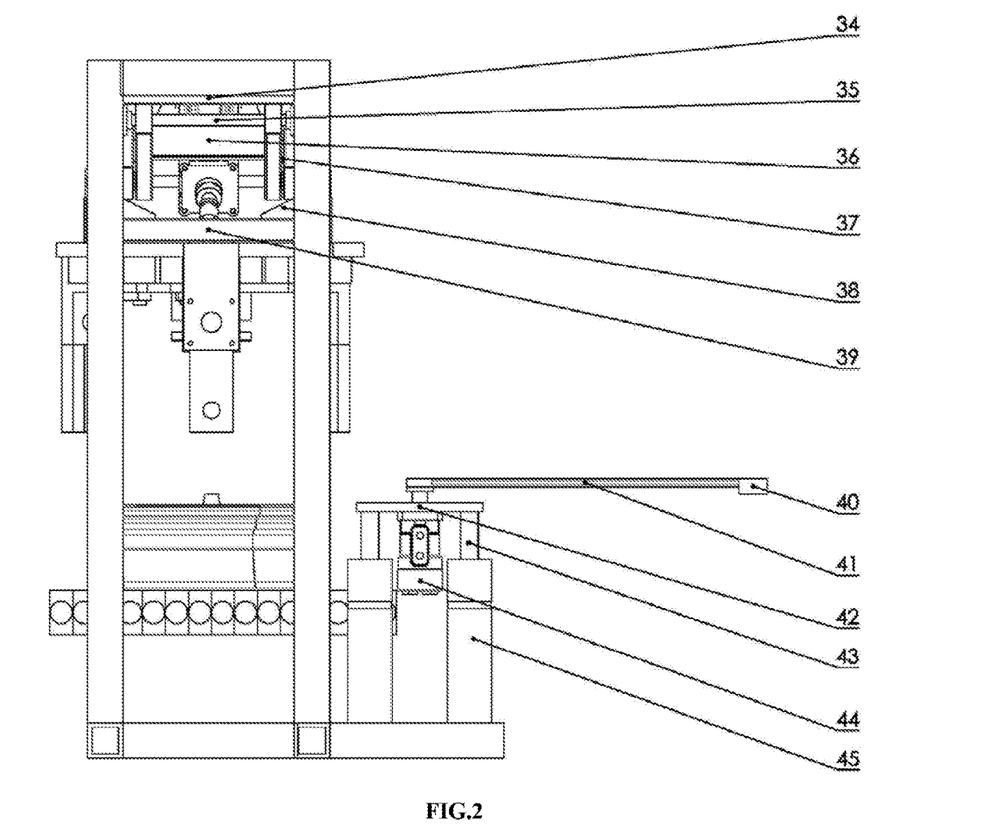
FIG. 2 is a left view of a device for degating of an aluminum wheel blank by laser cutting in an initial state of the present invention.
Figure 3:
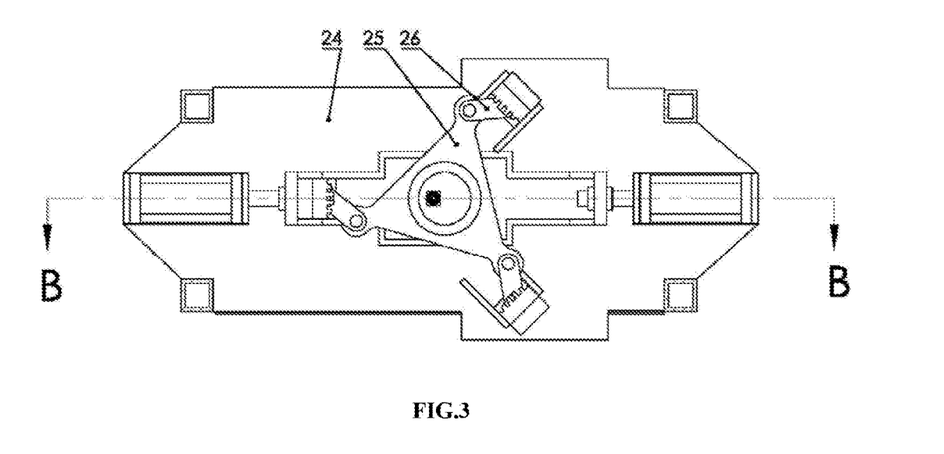
FIG. 3 is an A-A cutaway view of a device for degating of an aluminum wheel blank by laser cutting in an initial state of the present invention.
Figure 4:
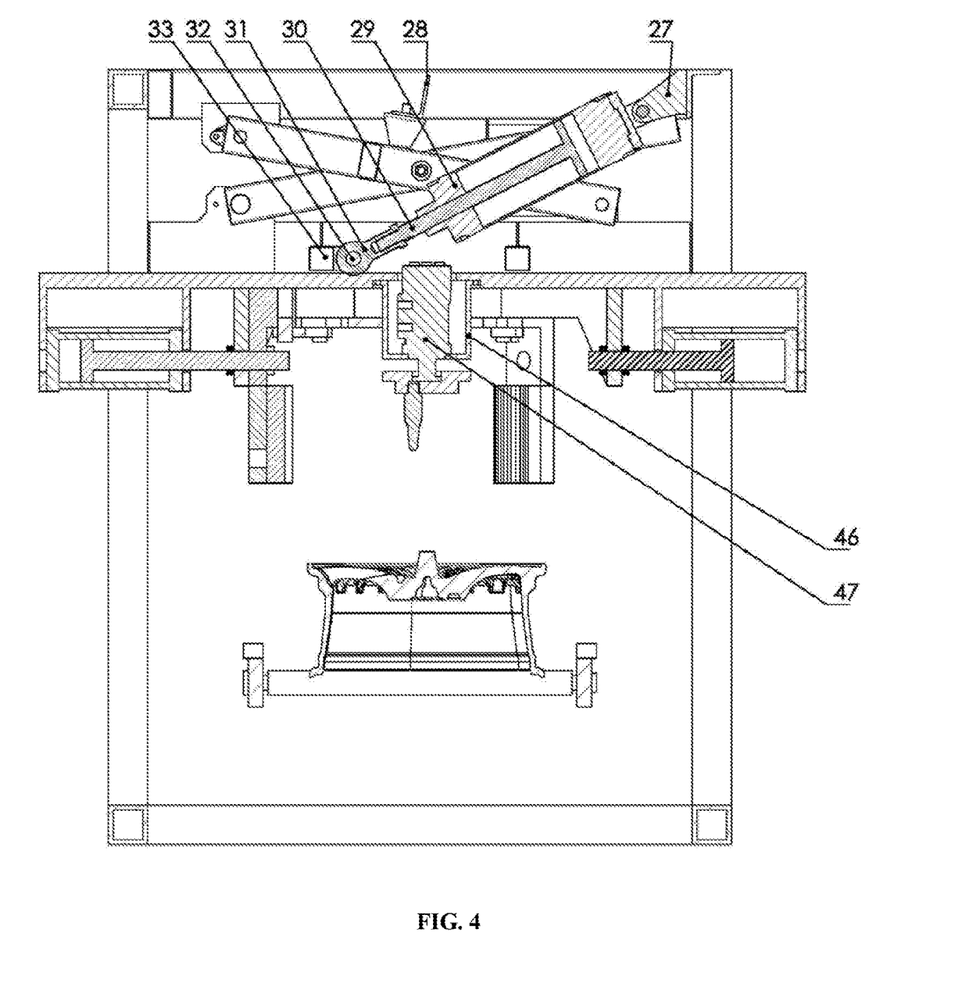
FIG. 4 is a B-B cutaway view of a device for degating of an aluminum wheel blank by laser cutting in an initial state of the present invention.
Figure 5:
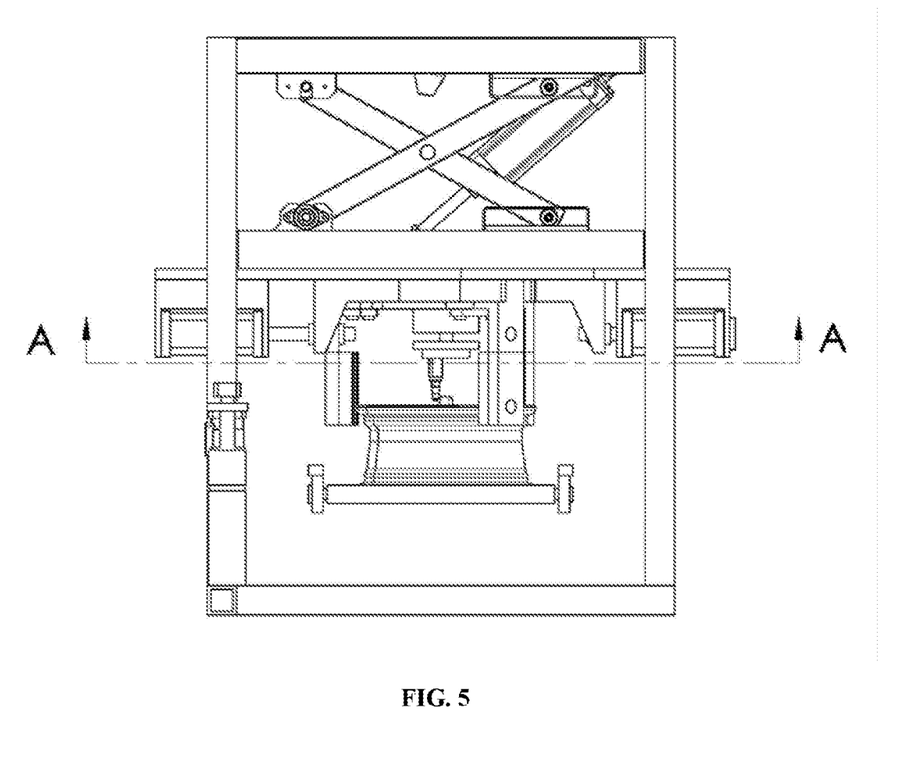
FIG. 5 is a front view of a device for degating of an aluminum wheel blank by laser cutting in a working state of the present invention.
Figure 6:
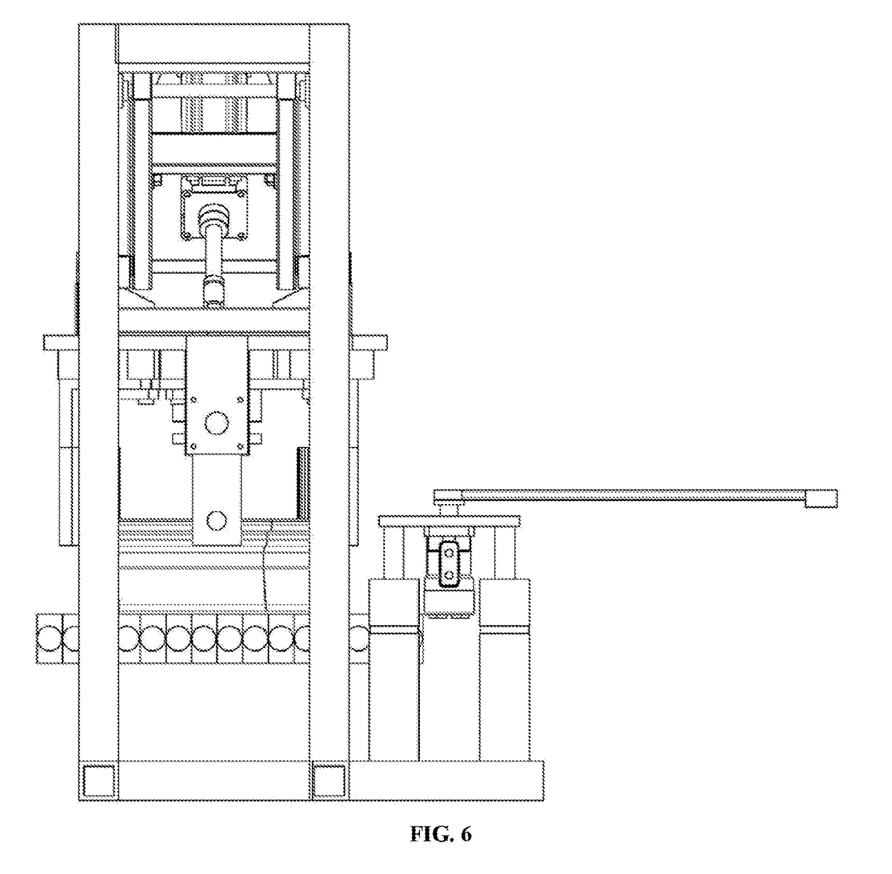
FIG. 6 is a left view of a device for degating of an aluminum wheel blank by laser cutting in a working state of the present invention.
Figure 7:
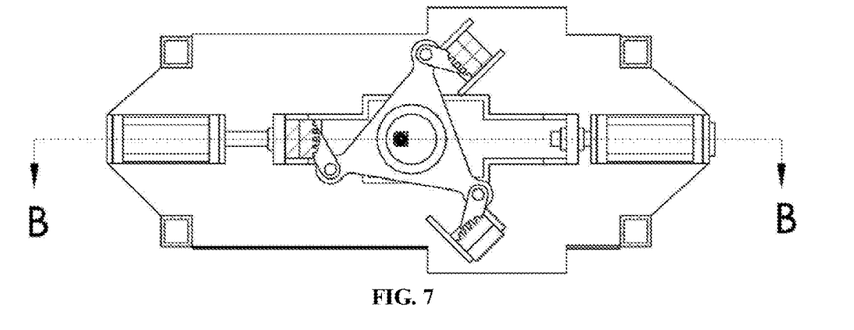
FIG. 7 is an A-A cutaway view of a device for degating of an aluminum wheel blank by laser cutting in a working state of the present invention.
Figure 8:
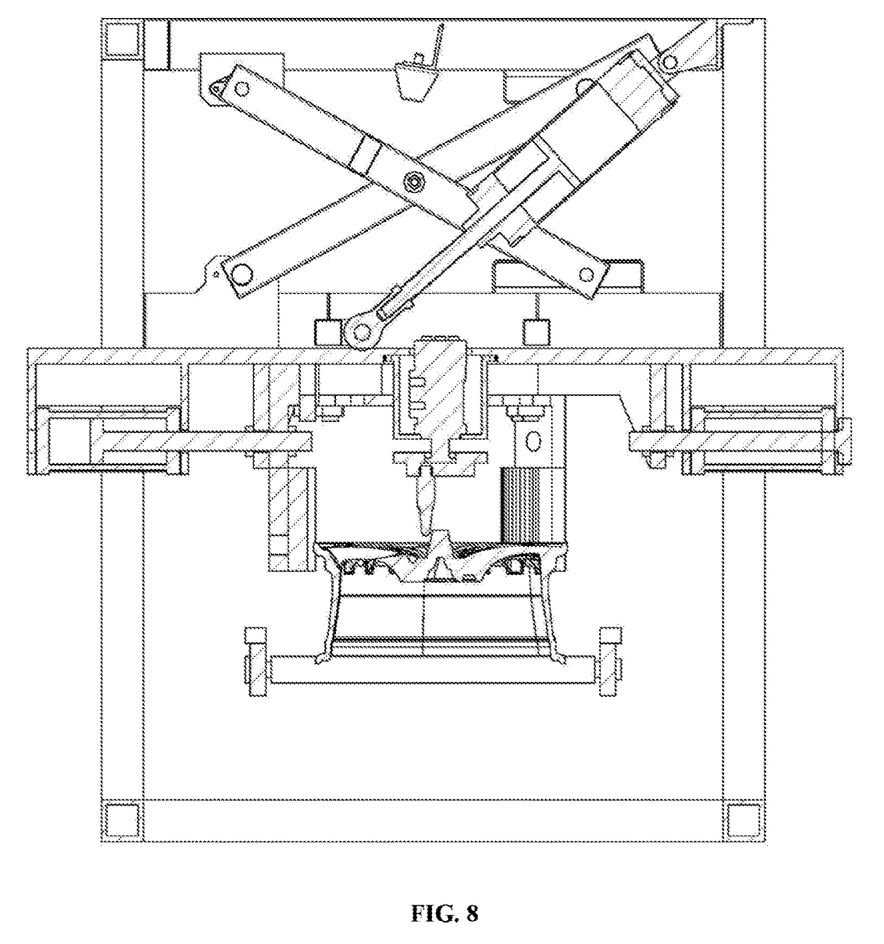
FIG. 8 is a B-B cutaway view of a device for degating of an aluminum wheel blank by laser cutting in a working state of the present invention.

In the FIGS., 1—lower lifting frame movable long beam, 2—middle lifting frame inner side oblique beam, 3—middle lifting frame pin shaft, 4—rubber supporting cushion, 5—upper lifting frame long fixed beam, 6—middle lifting frame outer side oblique beam, 7—stroke limiting frame, 8—stroke limiting wheel, 9—piston firm retaining ring, 10—frame-shaped guide plate, 11—directional sliding block, 12—grating positioning device, 13—wheel blank member, 14—roller way, 15—lower rack fixed frame, 16—lower gate taking device fixed frame, 17—laser cutting head, 18—eccentric turning wheel, 19—high-temperature-resistant resin clamping gasket, 20—clamping block, 21—rack vertical corner frame, 22—clamping hydraulic cylinder piston, 23—horizontal clamping hydraulic cylinder, 24—movable plate, 25—triangular connecting plate, 26—clamping connecting rod, 27—hydraulic cylinder fixing frame, 28—rubber cushion fixing corner bracket, 29—lifting hydraulic cylinder, 30—lifting hydraulic cylinder piston, 31—connecting pin, 32—lifting hydraulic cylinder piston connecting pin shaft, 33—lifting connecting frame, 34—upper lifting frame short fixed frame, 35—positioning pin for middle lifting frame inner side oblique beam, 36—middle connecting beam of inner beam, 37—middle outer cushion of inner beam, 38—triangular reinforced plate, 39—lower lifting frame movable short beam, 40—pneumatic jaw, 41—jaw connecting rod, 42—rotary motor fixing plate, 43—jaw lifting piston, 44—jaw rotary motor, 45—jaw hydraulic cylinder, 46—laser head rotary motor fixed cover, and 47—a laser head rotary motor.

DETAILED DESCRIPTION OF THE INVENTION

Embodiment 1

In the following, the details and working conditions of a specific device provided by the present invention are described in combination with figures.

During the actual operation, a grating positioning device 12 positions a wheel blank member 13 firstly and then a roller way 14 stops the rotation. An upper lifting hydraulic cylinder piston 30 performs ejection movement to drive a lifting connecting frame through a lifting hydraulic cylinder piston connecting pin shaft 32, making a lower lifting frame movable long beam 1 move downward together with all parts under a movable plate 24. When a laser cutting head 17 reaches a predetermined position, the lifting hydraulic cylinder piston 30 stops movement and keeps self-locking at this position.

Then, horizontal clamping hydraulic cylinder pistons 22 on both left and right sides start horizontal movements in the same direction, and a middle frame-shaped guide plate 10 and a directional sliding block 11 embedded therein are driven to move in the same direction by the corresponding clamping hydraulic cylinder piston 22. A clamping connecting rod 26 is mounted on the directional sliding block 11 through a pin shaft, and the other end of the clamping connecting rod is mounted on a circular head of a triangular connecting plate 25 to drive the triangular connecting plate 25 to rotate by taking a laser head rotary motor fixed cover 46 as a circular axis. In the meantime, directional sliding blocks 11 on both sides move inward to make three clamping blocks 20 mounted under the directional sliding blocks 11 move inward. When high-temperature-resistant resin clamping gaskets 19 on the clamping blocks 20 contact with the aluminum wheel blank member 13 and clamp it fixedly, the horizontal clamping hydraulic cylinder pistons 22 stop motion and are in self-locking positions.

Then a laser head rotary motor 47 begins to rotate. Because the laser cutting head 17 is mounted on an eccentric turning wheel 18 under the laser head rotary motor, the eccentric turning wheel 18 drives the laser cutting head 17 to rotate together during the rotation of the eccentric turning wheel 18, so as to achieve the purpose of cutting a gate.

After the cutting is completed, the middle laser head rotary motor 47 stops rotation, and the horizontal clamping hydraulic cylinder pistons 22 on both left and right sides of the movable plate 24 begin to move in opposite directions to loosen the aluminum wheel blank member 13 and stop the movement until the horizontal clamping hydraulic cylinder pistons 22 reach original positions, and then the lifting hydraulic cylinder piston 30 begins to move in an opposite direction to drive the movable plate 24 and all parts under the movable plate to move upward, so as to return to original positions.

In the meantime, jaw lifting pistons 43 on a left side of the rack start to move upward and stop when reaching a certain height, and a jaw rotary motor 44 begins to rotate to drive a jaw connecting rod 41 to rotate and stop when the jaw connecting rod reaches an upward side of the cut gate. The jaw lifting pistons 43 move downward and stop when a pneumatic jaw 40 at an end is in the middle position of the gate, and then the pneumatic jaw 40 is started to clamp the cut gate and is stopped when the jaw lifting pistons 43 begin to move upward, and the jaw rotary motor 44 rotates to drive the jaw connecting rod 41 and the pneumatic jaw 40 to return to original positions, and then the jaw lifting hydraulic pistons 43 move downward and stop until returning to original positions. Then the pneumatic jaw 40 loosens the gate and the cut gate waste falls into a waste tank. The cut wheel blank member 13 falls on the roller way 14 which starts running again, and the wheel blank member 13 leaves a cutting position and the cutting device waits for the next cutting cycle.

The invention claimed is:

1. A device for degating of an aluminum wheel blank by laser cutting, comprising the following members: a lower lifting frame movable long beam (1), a middle lifting frame inner side oblique beam (2), a middle lifting frame pin shaft (3), a rubber supporting cushion (4), an upper lifting frame long fixed beam (5), a middle lifting frame outer side oblique beam (6), a first stroke limiting frame (7), a first stroke limiting wheel (8), a second stroke limiting frame (7'), a second stroke limiting wheel (8'), piston firm retaining rings (9), frame-shaped guide plates (10), directional sliding blocks (11), grating positioning devices (12), a wheel blank member (13), a roller way (14), a lower rack fixed frame (15), a lower gate taking device fixed frame (16), a laser cutting head (17), an eccentric turning wheel (18), high-temperature-resistant resin clamping gaskets (19), clamping blocks (20), rack vertical corner frames (21), clamping hydraulic cylinder pistons (22), horizontal clamping hydraulic cylinders (23), a movable plate (24), a triangular connecting plate (25), three clamping connecting rods (26), a hydraulic cylinder fixing frame (27), a rubber cushion fixing corner bracket (28), a lifting hydraulic cylinder (29), a lifting hydraulic cylinder piston (30), a connecting pin (31), a lifting hydraulic cylinder piston connecting pin shaft (32), a lifting connecting frame (33), an upper lifting frame short fixed frame (34), a positioning pin (35) for middle lifting frame inner side oblique beam, a middle connecting beam (36) of inner beam, middle outer cushions (37) of inner beam, triangular reinforced plates (38), a lower lifting frame movable short beam (39), a pneumatic jaw (40), a jaw connecting rod (41), a rotary motor fixed plate (42), jaw lifting pistons (43), a jaw rotary motor (44), jaw hydraulic cylinders (45), a laser head rotary motor fixed cover (46) and a laser head rotary motor (47); the rack vertical corner frames (21) are mounted on the lower rack fixed frame (15), and the upper lifting frame long fixed beam (5) is mounted at top ends of the rack vertical corner frames (21) to form a rack; a first end of the middle lifting frame inner side oblique beam (2) is hinged to the upper lifting frame long fixed beam (5), the first stroke limiting wheel (8) is mounted on the other end of the middle lifting frame inner side oblique beam (2), the first stroke limiting wheel (8) is mounted to and rolls in the first stroke limiting frame (7), and the first stroke limiting frame (7) is fixed on the lower lifting frame movable long beam (1); a first end of the middle lifting frame outer side oblique beam (6) is hinged to the lower lifting frame movable long beam (1), the second stroke limiting wheel (8') is mounted on the other end of the middle lifting frame outer side oblique beam (6), the second stroke limiting wheel (8') is mounted to and rolls in the second stroke limiting frame (7'), and the second stroke limiting frame (7') is fixed under the upper lifting frame long fixed beam (5); the middle lifting frame inner side oblique beam (2) is hinged to the middle lifting frame outer side oblique beam (6) through the middle lifting frame pin shaft (3), so that the middle lifting frame outer side oblique beam (6) is located on the outside of the middle lifting frame inner side oblique beam (2); the rubber supporting cushion (4) is mounted under the upper lifting frame long fixed beam (5) through the rubber cushion fixing corner bracket (28) and is supported between the upper lifting frame long fixed beam (5) and the middle lifting frame inner side oblique beam (2) or the middle lifting frame outer side oblique beam (6) when the lower lifting frame movable long beam (1) rises; the lifting hydraulic cylinder piston (30) of the lifting hydraulic cylinder (29) is fixed to the lower lifting frame movable long beam (1) through the connecting pin (31) and the lifting connecting frame (33), and the other end of the lifting hydraulic cylinder (29) is fixed to the upper lifting frame long fixed beam (5) through the hydraulic cylinder fixing frame (27); the movable plate (24) is fixedly connected under the lower lifting frame movable long beam (1), the horizontal clamping hydraulic cylinders (23) are mounted at middle positions on both sides below the movable plate (24), the clamping hydraulic cylinder pistons (22) on left and right sides are locked and connected to corresponding sides of the frame-shaped guide plates (10) through the piston firm retaining rings (9), and one of the directional sliding blocks (11) is placed on an inner side of the corresponding frame-shaped guide plate (10) and is locked with one side of the corresponding clamping hydraulic cylinder piston (22) through the corresponding piston firm retaining ring (9), so that the frame-shaped guide plate (10) and said one of the directional sliding blocks (11) are driven to move together when the clamping hydraulic cylinder pistons (22) are set in a current movement; a hole is formed in a lower end of each directional sliding block (11), and the lower end of each directional sliding block (11) is connected to one of the three clamping connecting rods (26) through a pin, and the three clamping connecting rods (26) are respectively mounted to circular heads of three corners of the triangular connecting plate (25) by studs; the clamping blocks (20) are mounted on top ends of the directional sliding blocks (11), the high-temperature-resistant resin clamping gaskets (19) are mounted on inner sides of the clamping blocks (20), the laser head rotary motor (47) is mounted within the laser head rotary motor fixed cover (46), the laser head rotary motor fixed cover (46) is mounted on the movable plate through screws, the eccentric turning wheel (18) is mounted under the laser head rotary motor (47), and a hole is formed in the eccentric turning wheel (18) to mount the laser cutting head (17); the lower gate taking device fixed frame (16) is mounted on a left side of the rack, the jaw hydraulic cylinder (45) is mounted above the lower gate taking device fixed frame (16), and the jaw lifting pistons (43) of the jaw hydraulic cylinders (45) are mounted on the rotary motor fixing plate (42), a circular hole is formed in the middle of the rotary motor fixing plate (42) for fixing the jaw rotary motor (44), and the jaw rotary motor (44) is fixed and connected to the jaw connecting rod (41), and the pneumatic jaw (40) is mounted at an end of the jaw connecting rod (41).

\* \* \* \* \*